United States Patent
Seon et al.

(10) Patent No.: US 12,412,898 B2
(45) Date of Patent: Sep. 9, 2025

(54) BINDER COMPOSITION FOR SECONDARY BATTERY, NEGATIVE ELECTRODE FOR SECONDARY BATTERY INCLUDING THE SAME, AND LITHIUM SECONDARY BATTERY INCLUDING THE SAME

(71) Applicant: SK On Co., Ltd., Seoul (KR)

(72) Inventors: Min Kyung Seon, Daejeon (KR); Gwi Ok Park, Daejeon (KR); Seok Keun Yoo, Daejeon (KR); Dong Gun Lee, Daejeon (KR); Jun Soo Son, Daejeon (KR); Ju Ho Chung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 418 days.

(21) Appl. No.: 17/970,259

(22) Filed: Oct. 20, 2022

(65) Prior Publication Data

US 2023/0130685 A1    Apr. 27, 2023

(30) Foreign Application Priority Data

Oct. 21, 2021    (KR) .................. 10-2021-0141216

(51) Int. Cl.
| | | |
|---|---|---|
| *H01M 4/62* | (2006.01) | |
| *C08L 31/04* | (2006.01) | |
| *H01M 4/36* | (2006.01) | |
| *H01M 4/38* | (2006.01) | |
| *H01M 4/587* | (2010.01) | |
| *H01M 10/0525* | (2010.01) | |
| *H01M 4/02* | (2006.01) | |

(52) U.S. Cl.
CPC ............ *H01M 4/622* (2013.01); *C08L 31/04* (2013.01); *H01M 4/364* (2013.01); *H01M 4/386* (2013.01); *H01M 4/587* (2013.01); *H01M 10/0525* (2013.01); *C08L 2203/20* (2013.01); *H01M 2004/027* (2013.01)

(58) Field of Classification Search
None
See application file for complete search history.

(56) References Cited

U.S. PATENT DOCUMENTS

| | | |
|---|---|---|
| 2009/0136845 A1 | 5/2009 | Choi et al. |
| 2009/0305139 A1 | 12/2009 | Oh et al. |
| 2021/0050595 A1 | 2/2021 | Kim et al. |

FOREIGN PATENT DOCUMENTS

| | | |
|---|---|---|
| JP | H11250915 A | 9/1999 |
| KR | 1020040025091 A | 3/2004 |
| KR | 1020080021270 A | 3/2008 |
| KR | 101617668 B1 | 5/2016 |
| KR | 1020180012384 A | 2/2018 |
| KR | 1020190082977 A | 7/2019 |
| KR | 1020210020733 A | 2/2021 |
| WO | 2018101134 A1 | 6/2018 |

*Primary Examiner* — Carlos Barcena
(74) *Attorney, Agent, or Firm* — The Webb Law Firm

(57) ABSTRACT

Provided are a binder composition for a secondary battery, a negative electrode including the same, and a secondary battery including the same. More particularly, the binder composition for a secondary battery having a three-dimensional structure, which is prepared by mixing a copolymer having specific repeating units and a polymer-type additive containing nitrogen (N) bonded to two or three carbons (C) in the repeating unit, has excellent mechanical properties and may effectively improve a binding force. The negative electrode and the secondary battery including the binder composition for a secondary battery effectively suppress expansion of a negative electrode to manufacture a secondary battery having excellent charge/discharge cycle characteristics and battery performance.

17 Claims, No Drawings

BINDER COMPOSITION FOR SECONDARY BATTERY, NEGATIVE ELECTRODE FOR SECONDARY BATTERY INCLUDING THE SAME, AND LITHIUM SECONDARY BATTERY INCLUDING THE SAME

CROSS-REFERENCE TO RELATED APPLICATION

This application claims priority to Korean Patent Application No. 10-2021-0141216, filed Oct. 21, 2021, the disclosure of which is hereby incorporated by reference in its entirety.

BACKGROUND OF THE INVENTION

Field of the Invention

The following disclosure relates to a binder composition for a secondary battery, a negative electrode including the same, and a secondary battery including the same.

More particularly, the following disclosure relates to a binder composition for a secondary battery which may form a three-dimensional structure by including a copolymer including specific repeating units and a polymer-type additive containing nitrogen (N) bonded to two or three carbons (C) in the repeating unit, a negative electrode for a secondary battery having excellent mechanical properties and an improved binding force which is manufactured using the same, and a secondary battery including the same.

Description of Related Art

As a secondary battery application range is expanded to electric vehicles and power storage, a demand for developing an electrode having high stability, long life, high energy density, and high output properties is growing.

A lithium secondary battery may be a battery including a positive electrode including a positive electrode active material capable of inserting/desorbing lithium ions, a negative electrode including a negative electrode active material, a microporous separator between the positive electrode and the negative electrode, and a nonaqueous electrolyte.

Among them, as a negative electrode active material, a silicon-based active material is increasingly used due to a significantly increased charge and discharge capacity, but the volume expands by a lithium ion during charging and discharging, thereby greatly affecting the stability of the battery. For example, when a silicon-based material is used as the negative electrode active material, the volume may be increased up to 300% in some cases, and thus, there is a limitation to using it, which causes charge discharge and characteristics to be significantly lowered.

In order to solve the problem, a technology of a binder for a negative electrode active material has been developed. For example, in order to suppress a change in volume due to the charge and discharge of, in particular, a silicon-based negative electrode active material as described above, a technology of forming a negative electrode active material layer using a binder such as carboxymethyl cellulose (CMC) and styrene butadiene rubber (SBR) as a binder of a negative electrode active material has been developed. However, the binder for a negative electrode active material may partly solve the problem of excessive volume expansion, but there is still a need to suppress volume expansion, and also, there is still a problem in that due to its low adhesion, an active material is desorbed as charge and discharge progress, thereby deteriorating battery characteristics.

Therefore, there is a need to develop a novel binder for a negative electrode active material, which suppresses a change in volume of an electrode occurring as charge and discharge progress, retains sufficient adhesive strength to prevent deterioration of battery performance due to release or desorption of an active material, and is not deteriorated.

In addition, development of a novel binder for a secondary battery, which may promote battery life characteristics and performance improvement by developing a binder having the characteristics, is demanded.

SUMMARY OF THE INVENTION

An embodiment of the present invention is directed to providing a binder composition for a secondary battery having excellent mechanical properties and improved adhesion.

Another embodiment of the present invention is directed to providing a negative electrode slurry composition for a secondary battery having improved coatability and adhesion and a negative electrode including the same, using the binder composition.

Still another embodiment of the present invention is directed to providing a negative electrode having significantly improved charge/discharge cycle characteristics and battery performance and a secondary battery including the same, by effectively suppressing desorption a negative electrode active material and expansion of a negative electrode.

In one general aspect, a binder composition for a secondary battery, the binder composition includes: a copolymer and a polymer-type additive comprising nitrogen (N) bonded to two or three carbons (C) in the repeating unit, wherein the copolymer repeating unit (a) of the following Chemical Formula 1, a repeating unit (b) of the following Chemical Formula 2, a repeating unit (c) of the following Chemical Formula 3, and a repeating unit (d) of the following Chemical Formula 4:

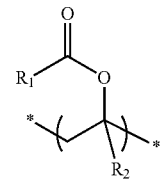

[Chemical Formula 1]

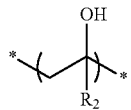

[Chemical Formula 2]

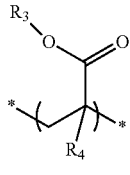

[Chemical Formula 3]

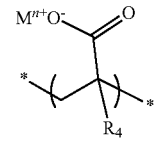

[Chemical Formula 4]

wherein
R₁ and R₃ are independently substituted or unsubstituted hydrocarbyl having 1 to 10 carbon atoms; R₂ and R₄ are independently hydrogen or substituted or unsubstituted hydrocarbyl having 1 to 10 carbon atoms; $M^{n+}$ is a cation having an oxidation number of n except for a hydrogen ion; and n is an integer of 1 to 3.

In the binder composition for a secondary battery according to an exemplary embodiment, the polymer-type additive may be a polyalkyleneimine-based polymer or polyvinylpyrrolidone-based polymer.

In the binder composition for a secondary battery according to an exemplary embodiment, the polymer-type additive may be a branched polyalkyleneimine-based polymer.

In the binder composition for a secondary battery according to an exemplary embodiment, the polymer-type additive may be a branched polyethyleneimine having a weight average molecular weight of 10,000 to 50,000 g/mol.

In the binder composition for a secondary battery according to an exemplary embodiment, the polymer-type additive may be included at 0.1 to 20 wt % with respect to the binder composition for a secondary battery.

In the binder composition for a secondary battery according to an exemplary embodiment, in the copolymer, (a+b): (c+d) may be 0.05 to 0.95:0.95 to 0.05, wherein a, b, c, and d are mole fractions of the repeating units (a), (b), (c), and (d), respectively in the copolymer.

In the binder composition for a secondary battery according to an exemplary embodiment, the copolymer may satisfy the following Equation 1:

$$0.5 < (b+d)/(a+b+c+d) < 1.0 \quad \text{[Equation 1]}$$

wherein a, b, c, and d are mole fractions of the repeating units (a), (b), (c), and (d), respectively in the copolymer.

In the binder composition for a secondary battery according to an exemplary embodiment, the copolymer may be a linear polymer.

In the binder composition for a secondary battery according to an exemplary embodiment, the copolymer may have a weight average molecular weight of 200,000 to 2,000,000 Da.

In the binder composition for a secondary battery according to an exemplary embodiment, the binder composition for a secondary battery may be a binder composition for a lithium secondary battery negative electrode.

In another general aspect, a secondary battery includes a positive electrode and a negative electrode for a secondary battery, wherein the negative electrode for a secondary battery includes a current collector; and a negative electrode active material layer disposed on the current collector, and the negative electrode active material layer includes the binder composition for a secondary battery described above and a negative electrode active material.

In the secondary battery according to an exemplary embodiment, the negative electrode active material may include a silicon-based active material.

In the secondary battery according to an exemplary embodiment, the negative electrode active material may further include a graphite-based active material.

In the secondary battery according to an exemplary embodiment, a mass ratio between the silicon-based active material and the graphite-based active material may be 3 to 97:97 to 3.

In the secondary battery according to an exemplary embodiment, the binder composition for a secondary battery may be included at 0.5 to 30 wt % with respect to the negative electrode active material layer.

In still another general aspect, a method of preparing a binder composition for a secondary battery includes: (A) saponifying a copolymer including a repeating unit (a) of the following Chemical Formula 1 and a repeating unit (c) of the following Chemical Formula 3 to prepare a saponified copolymer; and (B) mixing the saponified copolymer and a polymer-type additive containing nitrogen (N) bonded to two or three carbons (C) in the repeating unit, wherein the saponified copolymer includes the repeating unit (a) of the following Chemical Formula 1, a repeating unit (b) of the following Chemical Formula 2, the repeating unit (c) of the following Chemical Formula 3, and a repeating unit (d) of the following Chemical Formula 4:

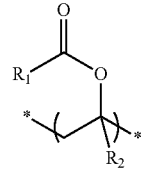

[Chemical Formula 1]

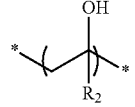

[Chemical Formula 2]

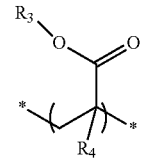

[Chemical Formula 3]

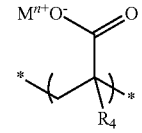

[Chemical Formula 4]

wherein
R₁ and R₃ are independently substituted or unsubstituted hydrocarbyl having 1 to 10 carbon atoms; R₂ and R₄ are independently hydrogen or substituted or unsubstituted hydrocarbyl having 1 to 10 carbon atoms; $M^{n+}$ is a cation having an oxidation number of n except for a hydrogen ion; and n is an integer of 1 to 3.

In the method of preparing a binder composition for a secondary battery according to an exemplary embodiment, a degree of saponification in step (A) may be more than 0.5 and less than 1.0, and the degree of saponification may be calculated by (b+d)/(a+b+c+d), wherein a, b, c, and d are mole fractions of the repeating units (a), (b), (c), and (d) in the saponified copolymer.

Other features and aspects will be apparent from the following detailed description, the drawings, and the claims.

DESCRIPTION OF THE INVENTION

Hereinafter, the present disclosure will be described in more detail. However, the following examples or exemplary embodiments are only a reference for describing the present disclosure in detail, and the present disclosure is not limited thereto and may be implemented in various forms.

In addition, unless otherwise defined, all technical terms and scientific terms have the same meanings as those commonly understood by one of those skilled in the art to which the present disclosure pertains.

The terms used for description in the present specification are only for effectively describing a certain exemplary embodiment, and are not intended to limit the present disclosure.

In addition, the singular form used in the specification and claims appended thereto may be intended to include a plural form also, unless otherwise indicated in the context.

In addition, units used in the present specification without particular mention are based on weights, and as an example, a unit of % or ratio refers to a wt % or a weight ratio and wt % refers to wt % of any one component in a total composition, unless otherwise defined.

In addition, unless particularly described to the contrary, "comprising" or "containing" or "including" any elements will be understood to imply further inclusion of other elements rather than the exclusion of any other elements.

In addition, the numerical range used in the present specification may include all values within the range including the lower limit and the upper limit, increments logically derived in a form and span in a defined range, all double limited values, and all possible combinations of the upper limit and the lower limit in the numerical range defined in different forms. Unless otherwise defined in the specification of the present invention, values which may be outside a numerical range due to experimental error or rounding off are also included in the defined numerical range.

A "hydrocarbon" described in the present specification refers to a chemical group containing only hydrogen and carbon atoms.

"Hydrocarbyl" or "heterohydrocarbyl" described in the present specification refers to a radical having one bonding site derived from a hydrocarbon or heterohydrocarbon, and "hetero-" means that carbon is substituted by one or more heteroatoms selected from B, O, N, C(=O), P, P(=O), S, S(=O)$_2$, and a Si atom.

Hereinafter, the present disclosure will be described in more detail.

The present disclosure relates to a binder composition for a secondary battery having a three-dimensional structure prepared by mixing a copolymer for a secondary battery binder composition including specific repeating units with a polymer-type additive containing nitrogen (N) bonded to two or three carbons (C) in the repeating unit (hereinafter, referred to as a polymer-type additive). A negative electrode manufactured by mixing the binder with a negative electrode active material and a secondary battery including the negative electrode have excellent mechanical properties and an improved binding force, thereby effectively suppressing exfoliation and desorption of the negative electrode active material and expansion of the negative electrode even when a silicon-based negative electrode active material is used, and providing a negative electrode for a secondary battery having improved charge and discharge characteristics and battery performance, and a secondary battery including the same.

The present disclosure provides a binder composition for a secondary battery, the binder composition includes: a copolymer including a repeating unit (a) of the following Chemical Formula 1, a repeating unit (b) of the following Chemical Formula 2, a repeating unit (c) of the following Chemical Formula 3, and a repeating unit (d) of the following Chemical Formula 4, and a polymer-type additive containing nitrogen (N) bonded to two or three carbons (C) in the repeating unit, thereby forming three-dimensional structure. The binder composition for a secondary battery forms a three-dimensional structure by a hydrogen bond, thereby showing excellent mechanical properties and an improved binding force, and thus, effectively suppressing the exfoliation and desorption of the negative electrode active material and the expansion of the negative electrode, even when a silicon-based negative electrode active material is used. In addition, a negative electrode for a secondary battery having improved charge/discharge cycle characteristics and battery performance, and a secondary battery including the same may be manufactured, using the binder composition for a secondary battery:

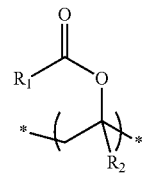

[Chemical Formula 1]

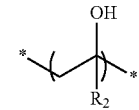

[Chemical Formula 2]

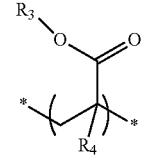

[Chemical Formula 3]

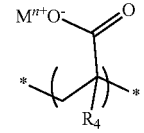

[Chemical Formula 4]

wherein $R_1$ and $R_3$ are independently substituted or unsubstituted hydrocarbyl having 1 to 10 carbon atoms; $R_2$ and $R_4$ are independently hydrogen or substituted or unsubstituted hydrocarbyl having 1 to 10 carbon atoms; $M^{n+}$ is a cation having an oxidation number of n except for a hydrogen ion; and n is an integer of 1 to 3.

Specifically, an example of $R_1$ and $R_3$ may be independently alkyl having 1 to 5 carbon atoms, and a specific example thereof may be methyl, ethyl, or propyl. An example of $R_2$ and $R_4$ may be independently hydrogen or alkyl having 1 to 5 carbon atoms, and a specific example thereof may be hydrogen or methyl.

An exemplary embodiment of the repeating unit (a) of Chemical Formula 1 may be a vinyl acetate-derived unit, an exemplary embodiment of the repeating unit (b) of Chemical Formula 2 may be a vinyl alcohol-derived unit, an exemplary embodiment of the repeating unit (c) of Chemical Formula 3 may be a (meth)acrylate-derived unit, and an exemplary embodiment of the repeating unit (d) of Chemical Formula 4 may be an ionized substituted (meth)acrylic acid-derived unit. The (meth)acrylate may include both acrylate or methacrylate, and specifically, may be one or a combination of two or more selected from the group consisting of acrylate, methyl ethyl acrylate, methyl methacrylate, ethyl methacrylate, and the like. In addition, the (meth) acrylic acid may include both acrylic acid or methacrylic acid.

A cation of a salt of the ionized substituted (meth)acrylic acid($M^{n+}$) salt may be an alkali metal ion when n is 1, specifically, may be at least one selected from a sodium ion, a potassium ion, a lithium ion, and the like, and may be an ammonium ion ($NH_4^+$). In addition, when n is 2, it may be an alkaline earth metal ion, and specifically, may be a calcium ion or a magnesium ion. When n is 3, it may be an ion of a metal such as Al or Ga, but is not limited thereto as long as it is commonly used or known metal ion.

In addition, the copolymer may be prepared by various known methods such as emulsion polymerization, suspension polymerization, solution polymerization, and bulk polymerization.

In addition, the copolymer may include known repeating units other than the repeating unit (a) to the repeating unit (d), but is not limited thereto.

In the binder composition for a secondary battery according to an exemplary embodiment, the copolymer is characterized by including all of the repeating unit (a) to the repeating unit (d). The copolymer including no repeating unit (c) has high stiffness in an aqueous solution state and a short persistence length, so that a copolymer chain may have an excessive linear form, and also, the copolymer including no repeating unit (d) may have a spherical shape such as a random coil. Accordingly, the copolymer according to an exemplary embodiment maintains a conformation between a random coil and a linear shape in an aqueous solution state, and thus, when the polymer-type additive is added thereto, it may help to prepare a binder composition for a secondary battery having a more robust three-dimensional structure.

In the binder composition for a secondary battery according to an exemplary embodiment, a binder composition for a secondary battery including a copolymer including repeating units (a) to (d); and a polymer-type additive containing nitrogen (N) bonded to two or three carbons (C) in the repeating unit improves a binding force between a negative electrode current collector and a negative electrode active material layer, and/or of a negative electrode active material layer, thereby suppressing the exfoliation and desorption of the negative electrode active material and also improving the strength and flexibility of the negative electrode active material layer. In addition, even when a silicon-based negative electrode active material is used, expansion may be effectively suppressed to stabilize battery performance.

The binder composition for a secondary battery according to an exemplary embodiment may be a binder composition for a lithium secondary battery negative electrode a binder composition for a lithium secondary battery positive electrode, but specifically, may be a binder composition for a lithium secondary battery negative electrode.

In the binder composition for a secondary battery according to an exemplary embodiment, the copolymer may be a random copolymer, a block copolymer, or a tapered copolymer in which the repeating units (a) to (d) form a backbone, and the kind is not limited. Specifically, it may be a random copolymer, and a random copolymer including the repeating units (a) to (d) has excellent solubility with water to have improved processability and workability in the preparation of a negative electrode slurry composition for a secondary battery, and has excellent tensile strength and flexibility to improve the strength and flexibility of the negative electrode active material layer.

In the binder composition for a secondary battery according to an exemplary embodiment, the copolymer may be a linear polymer or a branched polymer, and specifically, may be a linear polymer. When the copolymer is a linear polymer, a copolymer forming a three-dimensional structure by the polymer-type additive has a larger radius of gyration in a solvent, and thus, may be effectively bound to the negative electrode active material, thereby more effectively suppressing desorption of the negative electrode active material from the negative electrode. Accordingly, during charging and discharging of a secondary battery, the expansion of the negative electrode may be effectively suppressed to further improve the charge/discharge cyclecharacteristics of the secondary battery and battery performance.

In the binder composition for a secondary battery according to an exemplary embodiment, the copolymer may have a weight average molecular weight of 200,000 to 2,000,000 Da, specifically 400,000 to 1,500,000 Da, and more specifically 500,000 to 1,200,000 Da. When the weight average molecular weight range is satisfied, the mechanical properties and adhesive properties of the binder composition for a secondary battery may be improved, and the exfoliation and desorption of the negative electrode active material and the expansion of the negative electrode may be more effectively suppressed to manufacture a secondary battery having excellent charge/discharge cyclecharacteristics and battery performance.

In the binder composition for a secondary battery according to an exemplary embodiment, a mole fraction ratio of (a+b):(c+d) in the copolymer may be 0.05 to 0.95:0.95 to 0.05, specifically 0.25 to 0.95:0.75 to 0.05, and more specifically 0.5 to 0.95:0.5 to 0.05. The binder composition for a secondary battery including the copolymer satisfying the range shows further improved adhesive properties, and when negative electrode and a secondary battery are manufactured using the composition, significantly improved charge and discharge characteristics and battery performance may be implemented, wherein a, b, c, and d are mole fractions of the repeating units (a), (b), (c), and (d), respectively in the copolymer.

In the binder composition for a secondary battery according to an exemplary embodiment, a and b of the copolymer may be included at a mole fraction ratio of a:b of 0.05 to 0.6:0.95 to 0.4, specifically 0.1 to 0.5:0.9 to 0.5, and more specifically 0.15 to 0.45:0.85 to 0.55, but is not limited thereto as long as the purpose of the present disclosure is achieved.

In the binder composition for a secondary battery according to an exemplary embodiment, c and d of the copolymer may be included at a mole fraction ratio of c:d of 0.05 to 0.5:0.95 to 0.5, specifically 0.05 to 0.5:0.95 to 0.5, and more specifically 0.1 to 0.45:0.9 to 0.55.

In the binder composition for a secondary battery according to an exemplary embodiment, the copolymer may satisfy the following Equation 1, specifically the following Equation 2, and more specifically the following Equation 3:

$$0.5<(b+d)/(a+b+c+d)<1.0 \qquad \text{[Equation 1]}$$

$$0.5<(b+d)/(a+b+c+d)<0.9 \qquad \text{[Equation 2]}$$

$$0.7<(b+d)/(a+b+c+d)<0.8 \qquad \text{[Equation 3]}$$

wherein a, b, c, and d are mole fractions of the repeating units (a), (b), (c), and (d), respectively in the copolymer.

The binder composition for a secondary battery including the copolymer satisfying Equation 1, specifically Equation 2, and more specifically Equation 3, has better tensile strength and adhesive properties, and when a negative electrode slurry composition for a secondary battery is prepared by including the binder composition, the slurry composition has no agglomeration and has improved coatability, and the adhesive properties of the binder composition for a secondary battery are further improved, thereby effectively suppressing the exfoliation and desorption of the negative electrode active material from a current collector. When a negative electrode and a secondary battery are manufactured using the binder composition for a secondary battery having coatability and adhesive properties as such, the expansion of a negative electrode is effectively suppressed to improve the charge/discharge cycle characteristics and performance of a secondary battery, which is thus preferred, but the present disclosure is not limited thereto as long as the purpose of the present disclosure is achieved.

In the binder composition for a secondary battery according to an exemplary embodiment, the copolymer may be included at 70 to 99.99 wt %, specifically 80 to 99.9 wt %, and more specifically 85 to 99.9 wt % with respect to the total weight of the binder composition for a secondary battery based on a dry weight, but is not limited thereto.

In the binder composition for a secondary battery according to an exemplary embodiment, the additive may be used without significant limitation as long as it is a polymer containing nitrogen (N) bonded to two or three carbons (C) in the repeating unit, and nitrogen (N) bonded to two or three carbons (C) may be included in the main chain or the side chain of the polymer-type additive. Specifically, the polymer-type additive may be a polyalkyleneimine-based polymer or a polyvinylpyrrolidone-based polymer. More specifically, the polymer-type additive may be a branched polyalkyleneimine-based polymer.

In the binder composition for a secondary battery according to an exemplary embodiment, the polymer-type additive may have a weight average molecular weight of 300 to 300,000 g/mol, specifically 500 to 200,000 g/mol, and more specifically 10,000 to 50,000 g/mol. In addition, the polymer-type additive may be branched or linear, and specifically, may be branched. The linear polyalkyleneimine-based polymer may include a secondary amine in the main chain of the polymer except the end, and the branched polyalkyleneimine-based polymer may include a primary amine at the end and secondary and tertiary amines in the main chain of the polymer except the end.

A non-limiting example of the polyalkyleneimine-based polymer may be one or a combination of two or more selected from the group consisting of polyethyleneimine, polypropyleneimine, polybutyleneimine, and the like, but is not limited thereto.

In addition, the polyalkyleneimine-based polymer may be included at 0.01 to 20 wt %, specifically 0.05 to 10 wt %, and more specifically 0.1 to 5 wt % with respect to the binder composition for a secondary battery based on the dry weight.

In the binder composition for a secondary battery according to an exemplary embodiment, the polymer-type additive may be a branched polyethyleneimine having a weight average molecular weight of 10,000 to 50,000 g/mol, specifically 15,000 to 35,000 g/mol, and the polyalkyleneimine-based polymer satisfying the range may be produced into a binder composition for a secondary battery having a more robust three-dimensional structure. In addition, a secondary battery manufactured using the binder composition for a secondary battery suppresses the expansion of a negative electrode to show a lower expansion rate and an improved capacity retention rate, thereby effectively improving the charge/discharge cycle characteristics and the performance of the secondary battery.

In the binder composition for a secondary battery according to an exemplary embodiment, the polyvinylpyrrolidone-based polymer may have a weight average molecular weight of 10,000 to 2,000,000 g/mol, specifically 50,000 to 1,000,000 g/mol, and more specifically 100,000 to 700,000 g/mol or 300,000 to 400,000 g/mol, but is not particularly limited thereto as long as it is a polyvinylpyrrolidone-based polymer containing nitrogen bonded to three carbons in the repeating unit.

In addition, the polyvinylpyrrolidone-based polymer may be included at 0.1 to 30 wt %, specifically 1 to 25 wt %, and more specifically 3 to 20 wt % with respect to the binder composition for a secondary battery based on the dry weight.

In the binder composition for secondary battery according to an exemplary embodiment, the polymer-type additive may be included at 0.01 to 30 wt %, specifically 0.1 to 20 wt %, and more specifically 0.1 to 15 wt % with respect to the binder composition for a secondary battery based on the dry weight. When the content range is satisfied, the expansion of a negative electrode is suppressed to show a lower expansion rate and an improved capacity retention rate, thereby effectively improving the charge/discharge cycle characteristics and the performance of the secondary battery.

In addition, the polymer-type additive may be used by being diluted at a concentration of 1 to 90 wt %, specifically 5 to 50 wt % in a solvent, but is not limited thereto.

In addition, the binder composition for a secondary include a solvent such as water, and the battery may further solid content of the binder composition for a secondary battery may be 0.1 to 40 wt %, specifically 1 to 20 wt %, but the solvent may be used with appropriate adjustments depending on working conditions such as viscosity and coatability.

The present disclosure may provide a negative electrode slurry composition for a secondary battery including the binder composition for a secondary battery described above and a negative electrode active material.

The negative electrode active material may be one or a combination of two or more selected from the group consisting of graphite-based active materials, platinum, palladium, silicon-based active material, silver, aluminum, bismuth, tin, zinc, silicon-carbon composite materials, and the like. For example, it may be more preferred to use a silicon-based active material or a negative electrode active material including a silicon-based active material since better effects are shown, but it is preferred in terms of suppressing expansion, and it is not limited in terms of excellent binding force or electrical properties. In a preferred exemplary embodiment, the negative electrode active material may include a silicon-based active material and further include a graphite-based active material, and a mass ratio between the silicon-based active material and the graphite-based active material may satisfy 3 to 97:97 to 3 or 10 to 90:90 to 10, but is not limited thereto.

The silicon-based active material may include a silicon-based material, for example, Si, $SiO_x$ ($0<x<2$), Si-Q alloys (Q is one or a combination of two or more selected from the group consisting of alkali metals, alkaline earth metals, Group 13 element, Group 14 elements, Group 15 elements, Group 16 elements, transition metals, rare earth elements, and the like, except Si and C), silicon-carbon composites, and the like. The silicon-carbon composite may include, for example, silicon carbide (SiC) or silicon-carbon particles having a core-shell structure, and as a non-limiting example, may be formed by depositing a silicon layer on a graphite core surface. As another example, the silicon-carbon particles may be formed by coating commercially available graphite particles with a silicon layer by a chemical vapor deposition (CVD) process using a silicon precursor compound such as a silane-based compound. In some exemplary embodiments, the particles may further include amorphous carbon coating, but are not limited thereto.

The graphite-based active material may be artificial graphite or a mixture of artificial graphite and natural graphite. The graphite-based active material may have an average particle diameter (D50) of 5 to 30 μm, specifically 8 to 20 μm, and may be amorphous, plate-like, flaky, spherical, or fibrous, but is not limited thereto. Meanwhile, when the graphite-based active material is a mixture of artificial graphite and natural graphite, specifically, the content of the artificial graphite may be equivalent to or higher than the content of the natural graphite, and the artificial graphite and the natural graphite may be included at a weight ratio of 50 to 95:50 to 5, specifically 50 to 90:50 to 10, and more specifically 60 to 90:40 to 10. Thus, adhesive strength between a current collector and an active material layer may be further improved, and a high-rate charge capacity retention rate and charge/discharge cyclecharacteristics of a battery may be improved.

The negative electrode slurry composition for a secondary battery according to an exemplary embodiment may further include a conductive material and a solvent.

The conductive material is used for imparting conductivity to an electrode, and may be used without significant limitation as long as it is an electronically conductive material without causing a chemical change in a battery, and as the conductive material, one or a combination of two or more selected from the group consisting of graphite-based conductive materials, carbon black-based conductive materials, graphene, carbon nanotubes (CNT), metal and metal compound-based conductive materials, and the like may be used. A non-limiting example of the carbon black-based conductive material may include acetylene black, ketjen black, denka black, thermal black, channel black, and the like; a non-limiting example of the carbon nanotubes may include single-walled carbon nanotubes (SWCNT), double-walled carbon nanotubes (DWCNT), multi-walled carbon nanotubes (MWCNT), rope carbon nanotubes, and the like; and a non-limiting example of metal-based or metal compound-based conductive materials may include tin, tin oxide, tin phosphate ($SnPO_4$), titanium oxide, potassium titanate, perovskite materials such as $LaSrCoO_3$ and $LaSrMnO_3$, and the like, but is not limited to the listed conductive materials. The conductive material may be included at 0.05 to 30 wt % with respect to the total weight of the negative electrode active material layer, but the content of the conductive material may be appropriately adjusted depending on its application purpose and physical properties.

The solvent is a solvent for forming a negative electrode slurry composition for a secondary battery, and may be an aqueous solvent such as water. The solvent may be used at a content to allow the composition to have appropriate viscosity, considering the applicability and coatability of the negative electrode slurry composition for a secondary battery. Otherwise, an organic solvent or a mixed solvent of an organic solvent and water may be used as needed. When an organic solvent is used, a non-limiting example thereof may be alcohol, ether, ester, ketone, hydrocarbon, and the like, and is not limited thereto as long as it is dissolved in the binder composition for a secondary battery described above.

The solid content of the negative electrode slurry composition for a secondary battery according to an exemplary embodiment may be 1 wt % or more, 5 wt % or more, 10 wt % or more, 20 wt % or more, 35 wt % or more, 40 wt % or more, 45 wt % or more, or 50 wt % or more, and though the upper limit is not limited, may be 60 wt % or less, 70 wt % or less, or 80 wt % or less, or 95 wt % or less, and is not limited thereto.

The present disclosure may provide a negative electrode for a secondary battery including a current collector; and a negative electrode active material layer disposed on the current collector, wherein the negative electrode active material layer includes the binder composition for a secondary battery described above.

The current collector may be one or a combination of two or more selected from the group consisting of copper foil, nickel foil, stainless foil, titanium foil, nickel foam, copper foam, a polymer substrate coated with a conductive metal, and the like, but is not limited thereto, and materials known in the art may be used without limitation.

In the negative electrode for a secondary battery according to an exemplary embodiment, the binder composition for a secondary battery may be included at 0.5 to 30 wt %, specifically 0.5 to 20 wt %, and more specifically 1 to 10 wt % with respect to the total weight of the negative electrode active material based on the dry weight, but the content of the binder is not particularly limited as long as the performance of the secondary battery to be desired in the present disclosure is not impaired. When the content of the binder satisfies the range, the expansion of a negative electrode and the desorption of a negative electrode active material occurring during charging and discharging may be effectively suppressed, thereby implementing the further improved capacity and energy density of the secondary battery.

The negative electrode active material layer may be prepared from the negative electrode slurry composition for a secondary battery described above.

In addition, the negative electrode active material layer may have a thickness of 1 to 150 μm, specifically 10 to 100 μm, and more specifically 20 to 80 μm, but is not limited thereto. The thickness may be adjusted by coating an appropriate coating amount depending on the solid content of the negative electrode slurry composition for a secondary battery described above, and specifically, the coating amount may be 0.1 to 20 mg/cm$^2$, specifically 1 to 10 mg/cm$^2$, but is not limited thereto.

The present disclosure may provide a secondary battery including a positive electrode and a negative electrode for a secondary battery, wherein the negative electrode for a secondary battery includes a current collector; and a negative electrode active material layer disposed on the current collector, and the negative electrode active material layer includes the binder composition for a secondary battery described above and a negative electrode active material. Here, since the binder composition for a secondary battery, the negative electrode active material, the negative electrode active material layer, the current collector, and the negative electrode for a secondary battery are as described above, the detailed description thereof will be omitted.

Specifically, the secondary battery may include a negative electrode for a secondary battery, a positive electrode, and an electrolyte, and may further include a separator interposed between the positive electrode and the negative electrode.

The positive electrode may include a current collector; and a positive electrode active material layer formed by applying a composition for a positive electrode including a positive electrode active material on the current collector.

The current collector may be a negative electrode current collector described above, and any known material in the art may be used, but is not limited thereto. In addition, the positive electrode active material layer may include a positive electrode active material, and optionally, may further include a binder for a positive electrode and a conductive material. The positive electrode active material may be any positive electrode active material known in the art, and may be, for example, a composite oxide of lithium with a metal selected from cobalt, manganese, nickel, and a combination thereof, but is not limited thereto. The binder for a positive electrode and the conductive material may be the negative electrode binder and the negative electrode conductive material described above, and any materials known in the art may be used, but is not limited thereto.

The electrolyte may be an electrolyte solution including an organic solvent and a lithium salt. The organic solvent serves as a medium in which ions involved in the electrochemical reaction of the battery may move, and for example, carbonate-based, ester-based, ether-based, ketone-based, alcohol-based, or aprotic solvents may be used, the organic solvent may be used alone or in combination of two or more, and when used in combination of two or more, a mixing ratio may be appropriately adjusted depending on battery performance to be desired. In addition, organic solvents known in the art may be used, but the present disclosure is not limited thereto.

The lithium salt is dissolved in the organic solvent and may act as a source of the lithium ion in the battery to allow basic operation of a lithium secondary battery and to promote movement of lithium ions between a positive electrode and a negative electrode. A non-limiting example of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$/$LiAlCl_4$, $LiN(C_xF_{2x+1}SO_2)(C_yF_{2y+1}SO_2)$ (x and y are natural numbers), $LiCl$, $LiI$, $LiB(C_2O_4)_2$, or a combination thereof, not but is limited thereto. The concentration of the lithium salt may be in a range of 0.1 M to 5.0 M, or 0.1 M to 2.0 M. When the concentration of the lithium salt satisfies the range, the electrolyte solution has appropriate conductivity and viscosity, thereby showing excellent electrolyte solution performance and effectively improving lithium ion mobility.

In addition, the electrolyte solution may further include pyridine, triethylphosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol and aluminum trichloride, and the like, if necessary, for improving charge/discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sultone (PRS), fluoro-propylene carbonate and FPC), and the like may be further included for improving conservation properties at a high temperature.

The separator is a separator having micropores formed to allow ions to pass through, and a non-limiting example thereof may be one or a combination of two or more selected from the group consisting of glass fiber, polyester, polyethylene, polypropylene, polytetrafluoroethylene, and the like and may be in a non-woven fabric or woven fabric form. Specifically, a polyolefin-based polymer separator such as polyethylene and polypropylene is mainly used in the lithium secondary battery, but is not limited thereto. In addition, a separator coated with a composition including a ceramic component or a polymer material may be used for securing thermal resistance or mechanical strength, the separator may be used optionally in a monolayer or multilayer structure, and a separator known in the art may be used, but is not limited thereto.

The secondary battery according to an exemplary embodiment may have an expansion rate of 75% or less. Specifically, the expansion rate may be 65% or less, more specifically 55% or less, 50% or less, or 45% or less, and the lower limit is not particularly limited, but may be 0.1% or more. The secondary battery according to an exemplary embodiment satisfies the expansion rate range, thereby effectively preventing the separation and desorption of an active material and improving the structural stability of an electrode to suppress an increase in resistance by volume expansion, even when a change in electrode volume occurs as charge and discharge progress, and thus, significantly improved charge/discharge cyclecharacteristics and battery performance may be implemented.

The capacity retention rate after 50 cycles of charging and discharging of the secondary battery according to an exemplary embodiment may be 80% or more. Specifically, the capacity retention rate may be 85% or more or 90% or more. The secondary battery according to an exemplary embodiment may maintain a high capacity retention rate after charging and discharging, and suppress the expansion of the negative electrode, and effectively improve the charge/discharge cycle characteristics and performance of a secondary battery.

The present disclosure provides a method of preparing a binder composition for a secondary battery including: (A) saponifying a copolymer including a repeating unit (a) of the following Chemical Formula 1 and a repeating unit (c) of the following Chemical Formula 3 to prepare a saponified copolymer; and (B) mixing the saponified copolymer and a polymer-type additive containing nitrogen (N) bonded to two or three carbons (C) in the repeating unit, wherein the saponified copolymer includes the repeating unit (a) of the following Chemical Formula 1, a repeating unit (b) of the following Chemical Formula 2, the repeating unit (c) of the following Chemical Formula 3, and a repeating unit (d) of the following Chemical Formula 4:

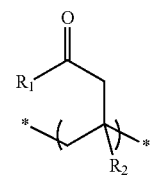

[Chemical Formula 1]

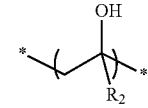

[Chemical Formula 2]

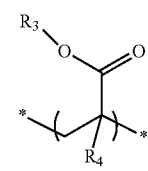

[Chemical Formula 3]

-continued

[Chemical Formula 4]

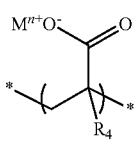

The detailed description of Chemical Formulae 1 to 4 is as described above, and thus, will be omitted.

In the method of preparing a binder composition for a secondary battery according to an exemplary embodiment, the copolymer of step (A) may be prepared from a polymerizable composition including vinyl acetate and alkyl (meth)acrylate, and may be prepared by various known methods such as emulsion polymerization, suspension polymerization, solution polymerization, or bulk polymerization. Otherwise, as the copolymer of step (A), commercially available products may be used without limitation.

A non-limiting example of the alkyl (meth)acrylate may be one or two or more selected from the group consisting of methyl acrylate, ethyl acrylate, propyl acrylate, isopropyl acrylate, n-butyl acrylate, isobutyl acrylate, methyl methacrylate, ethyl methacrylate, propyl methacrylate, isopropyl methacrylate, n-butyl methacrylate, isobutyl methacrylate, and the like.

In addition, the copolymer of step (A) may include known repeating units other than the repeating unit (a) and the repeating unit (c), but is not limited thereto.

In the method of preparing the binder composition for a secondary y according to an exemplary embodiment, the copolymer of step (A) may include a and c at a mole fraction ratio of a:c of 0.05 to 0.95:0.95 to 0.05, specifically 0.25 to 0.95:0.75 to 0.05, and more specifically 0.5 to 0.95:0.5 to 0.05, but is not limited thereto (wherein a and c are mole fractions of the repeating unit (a) and the repeating unit (c), respectively, in the copolymer).

In the method of preparing a binder composition for a secondary battery according to an exemplary embodiment, the saponification reaction may be used without limitation as long as it is known or commonly used, and specifically, may be performed by dissolving or dispersing the copolymer of step (A) in water with alcohol or alcohol and using an alkali catalyst or an acid catalyst, and the alcohol may be methanol, ethanol, propanol, tert-butanol, and the like without limitation, but specifically, may be methanol. The concentration of the copolymer in the alcohol may satisfy 10 to 60 wt %, specifically 15 to 55 wt %, but is not limited, and the concentration may be appropriately adjusted to the viscosity. As the catalyst, alkali catalysts such as alkali metal hydroxides or alkylates such as sodium hydroxide, potassium hydroxide, sodium methylate, sodium ethylate, potassium methylate, and lithium methylate, and acid catalyst such as sulfuric acid, hydrochloric acid, nitric acid, methanesulfonic acid, zeolite, and cation exchange resin may be used. In addition, the reaction temperature of the saponification reaction is not particularly limited, but 10 to 80° C., specifically 20 to 70° C.

In the method of preparing a binder composition for a secondary battery according to an exemplary embodiment, the degree of saponification in step (A) may be calculated by (b+d)/(a+b+c+d), and the calculated value may satisfy Equation 1, and specifically, may satisfy Equation 2, and more specifically, may satisfy Equation 3, wherein a, b, c, and d are mole fractions of the repeating units (a), (b), (c), and (d) in the saponified copolymer. When the saponified copolymer satisfies Equation 1, specifically Equation 2, and more specifically Equation 3, coatability, adhesive properties, and tensile strength may be further improved, and when the negative electrode slurry composition for a secondary battery is prepared by including the copolymer, the exfoliation and desorption of the negative electrode active material from a current collector may be effectively suppressed. In addition, the saponified copolymer satisfying the range is used to prepare a negative electrode slurry composition for a secondary battery and a negative electrode for a secondary battery, a binding force between the negative electrode active material and the current collector is effectively improved to effectively suppress the expansion of a negative electrode, thereby improving the charge/discharge cycle characteristics and the performance of a secondary battery, but the numerical value range of the degree of saponification is not limited thereto as long as the purpose of the present disclosure is achieved.

In the method of preparing a binder composition for a secondary battery according to an exemplary embodiment, the method of adding a polymer-type additive is not largely limited as long as it is a commonly used method or a known method, but, for example, the binder composition may be prepared by dissolving the saponified copolymer in water to prepare an aqueous solution having a centration of 5 to 50 wt %, and adding the additive dropwise for 10 minutes to 1 hour and stirring the solution for 4 hours or more, and also, the additive may be used at a concentration of 1 to 90 wt %, specifically 5 to 50 wt % in the solvent, but the present disclosure is not limited thereto.

In the method of preparing a binder composition for a secondary battery according to an exemplary embodiment, the binder composition for a secondary battery according to an exemplary embodiment may be prepared by step (B), and the binder composition may be present in an aqueous solution state. The binder composition may form three-dimensional structure by a hydrogen bond between the polymer-type additives and the saponified copolymer in an aqueous state, and thereafter, the three-dimensional structure may remain even after removing the solvent after a drying step.

In the method of preparing a binder composition for a secondary battery according to an exemplary embodiment, the detailed description of the saponified copolymer and the example of the compound are the same as the copolymer described for the binder composition for a secondary battery according to an exemplary embodiment above, and also, the specific description and the content of the polymer-type additive, and the example of the compound are as described above, and thus, will be omitted.

Hereinafter, the present disclosure will be described in more detail with reference to the Examples and Comparative Examples. However, the following Examples and Comparative tive Examples are only an example for describing the present disclosure in more detail, and do not limit the present disclosure in any way.

The physical properties of the following examples and comparative examples were measured by the following methods.

[Method of Evaluating Physical Properties]

1. Weight Average Molecular Weight [kDa]

The weight average molecular weight of the copolymers prepared in the examples and the comparative examples were measured using GPC (Agilent). Agilent Mixed C (×2ea) was used as a GPC column, tetrahydrofuran was used as a solvent, and polystyrene was used as a standard, and analysis was performed at room temperature, at a flow rate of 1 mL/min.

2. Tensile Strength [kgf/cm$^2$] and Yield Strain [%]

The tensile strength and the yield strain of the binder compositions prepared in the examples and the comparative examples were measured in accordance with ASTM D638. A specimen obtained by cutting a film having a thickness of 50 μm into type IV was prepared, the measurement was performed under the conditions of a speed of 3 mm/min., and the measured values are listed in Table 1.

3. Adhesion Test [N/20 mm]

The adhesion of the negative electrodes manufactured in the examples and the comparative examples were measured using UTM. A rolled negative electrode surface was adhered to a tape, the measurement was performed under the conditions of an angle of 180° and a speed of 30 mm/min., and the measured values are listed in Table 1.

4. Negative Electrode Slurry Composition Coatability

The negative electrode slurry composition for a secondary battery prepared in the examples and the comparative examples were coated on a copper foil, and the coatability was evaluated based on the following criteria. The evaluation results are shown in the following Table 2.

⊚: Coated in a Uniform Form Throughout and No Agglomerate Observed

○: Coated in a Uniform Form Throughout
(less than 5 agglomerates observed per unit area (100 mm×100 mm))

Δ: Some Agglomerates Observed
(5 or more and less than 20 agglomerates observed per unit area (100 mm×100 mm))

x: Many Agglomerates Observed
(20 or more agglomerates observed per unit area (100 mm×100 mm))

5. Evaluation of Battery Performance

A CR2016 coin type half cell was manufactured in the examples and the comparative examples and the electrochemical properties were evaluated.

1) Charge Capacity [mAh/g] and Discharge Capacity [mAh/g] at Cycle 1, and Initial (Charge and Discharge) Efficiency [%]

Secondary batteries manufactured in the examples and the comparative examples were charged and discharged once at 0.1 C between 0.01 V and 1.5 V to measure a charge capacity at cycle 1 (initial charge capacity) (mAh/g), a discharge capacity at cycle 1 (mAh/g), and initial (charge and discharge) efficiency (%) were measured, respectively, and the results are shown in the following Table 2.

2) Expansion Rate (%)

The thickness ($t_1$) of the secondary battery negative electrodes manufactured in the examples and the comparative examples was measured, a secondary battery was manufactured and charged to 0.01 V at 0.1 C-rate, and a half cell was disassembled to measure the thickness ($t_2$) of the negative electrode after charging. The expansion rate of the negative electrode was calculated by the following calculation formula, and the calculated expansion rate is shown in the following Table 2.

Expansion Rate (%)=($t_2$−$t_1$)/($t_1$−Current Collector Thickness)×100 [Calculation Formula]

wherein a current collector thickness is the thickness of a negative electrode current collector used in the manufacture of the secondary battery negative electrode.

3) Capacity Retention Rate [%] after Charging and Discharging of 50 Cycles

The secondary batteries manufactured in the examples and the comparative examples were charged and discharged three times at 0.1 C between 0.01 V and 1.5 V, and 50 cycles of charging and discharging to 0.5 C between 0.01 V and 1.0 V were performed to evaluate the charge/discharge cyclecharacteristics of the batteries. During the charging, CV current conditions were 0.01 C CV cutoff. The charge/discharge cyclecharacteristics were obtained by measuring a capacity retention rate after 50 cycles of charging and discharging, specifically by showing a ratio (%) of a discharge capacity after repeating 50 cycles of charging and discharging to an initial discharge capacity. The results are shown in the following Table 2.

Example 1

<Preparation of Copolymer and Binder Composition>

90 g of water, 0.91 g of sodium dodecylbenzenesulfonate, and 0.13 g of sodium hydrogen carbonate were added to a round bottom flask under a nitrogen atmosphere and stirring was performed. The temperature was raised to 65° C. with stirring, an aqueous solution of 0.05 g of potassium persulfate dissolved in 2 g of water was added thereto, 33.5 g of vinyl acetate and 16.5 g of methyl acrylate were added thereto for 3 hours, stirring was further performed for 2 hours, and the polymerization was completed. 450 g of a saturated sodium chloride aqueous solution was added to the polymerization solution to agglomerate a copolymer, and filtration and drying were performed to obtain 42 g of vinyl acetate/methyl acrylate copolymer. The obtained copolymer was dissolved in tetrahydrofuran, filtration was performed with a filter, and a weight average molecular weight was determined to be 760 kDa by a molecular weight measurement device (GPC, RI detector).

30 g of the copolymer prepared above, 150 ml of methanol, and 12.5 g of sodium hydroxide were added to 150 ml of water and completely dissolved therein, and stirring was performed at 60° C. for 12 hours to perform a saponification reaction. Next, the saponified copolymer was subjected to solidification in 1 L of ethanol, filtration, and drying steps, thereby finally obtaining 20 g of the saponified copolymer having a mole composition ratio of vinyl acetate/vinyl alcohol/methyl acrylate/sodium acrylic acid of 18/49/7/26. The composition ratio was confirmed by $^{13}$C-NMR.

9.9 g of the saponified copolymer was added to 89.1 g of water, and stirring was performed at 60° C. for 6 hours to dissolve the copolymer, thereby preparing an aqueous solution. Next, 1.0 g of a 10 wt % aqueous solution of a branched polyethyleneimine (weight average molecular weight: 800 g/mol) as an additive was added dropwise for 1 hour to an aqueous solution of the saponified copolymer dissolved therein, and then stirring was further performed for 4 hours to obtain a binder composition. The tensile strength of the prepared binder composition was measured, and is listed in the following Table 1.

<Manufacture of Secondary Battery Negative Electrode>

A negative electrode active material, a CNT-based conductive material, and the binder composition prepared above were added to water at a weight ratio satisfying 95.75:0.25:4.0, and were mixed, thereby preparing a negative electrode slurry composition for a secondary battery (solid content: 50 wt %). At this time, they were added so that the solid content (10 wt %) of the binder composition satisfied the weight ratio. Specifically, a mixture of 15 wt % of a silicon-based active material (Si/C) having an average particle diameter of 6 μm and 85 wt % of graphite (artificial graphite having an average particle diameter (D50) of 13 μm) was used as the negative electrode active material, a SW-CNT-based conductive material having an average length of 5 μm was used as the CNT-based conductive material, and a negative electrode slurry composition satisfying the weight ratio was dispersed by performing sufficient stirring at a speed of 45 rpm for 30 minutes or more using a planetary mixer. The thus-prepared negative electrode slurry composition was applied to a negative electrode Cu current collector (thickness: 10 μm) at an application amount of 5.6 mg/cm$^2$, dried in a vacuum oven at 70° C. for 10 hours, and rolled under the conditions of a temperature of 50° C. and a pressure of 15 MPa, thereby manufacturing a negative electrode having a final thickness of 50 μm. The adhesion of the negative electrode was measured and is listed in the following Table 1.

<Manufacture of Coin Cell (Secondary Battery)>

A polyethylene separator (thickness: 20 μm) was interposed between the negative electrode manufactured above and a lithium metal (thickness: 1 mm), and 1 M LiPF$_6$ dissolved in a mixed solvent including ethylene carbonate (EC)/fluoroethylene carbonate (FEC)/ethylmethyl carbonate (EMC)/diethyl carbonate (DEC) at a volume ratio of 20/10/20/50 was used as an electrolyte solution, thereby manufacturing a coin cell-type half battery (CR2016 coin half cell) according to a common manufacturing method. Battery performance was evaluated and is listed in the following Table 2.

Example 2

The process was performed in the same manner as in Example 1, except that 9.95 g of the saponified copolymer, 89.55 g of water, and 0.5 g of a 10 wt % aqueous solution of a branched polyethyleneimine (weight average molecular weight: 25,000 g/mol) as the additive instead of the branched polyethyleneimine (weight average molecular weight: 800 g/mol) were used. The measured physical properties are shown in the following Tables 1 and 2.

Example 3

The process was performed in the same manner as in Example 2, except that 0.5 g of a 10 wt % aqueous solution of a branched polyethyleneimine (weight average molecular weight: 270,000 g/mol) as the additive was used instead of the branched polyethyleneimine (weight average molecular weight: 25,000 g/mol). The measured physical properties are shown in the following Tables 1 and 2.

Example 4

The process was performed in the same manner as in Example 1, except that 1.0 g of a 10 wt % aqueous solution of a linear polyethyleneimine (weight average molecular weight: 13,000 g/mol) was used instead of the branched polyethyleneimine (weight average molecular weight: 800 g/mol) which was the additive. The measured physical properties are shown in the following Tables 1 and 2.

Example 5

The process was performed in the same manner as in Example 1, except that 9 g of the saponified copolymer, 81 g of water, and 10 g of a 10 wt % aqueous solution of polyvinylpyrrolidone (weight average molecular weight: 55,000 g/mol) instead of the branched polyethyleneimine (weight average molecular weight: 800 g/mol) which was the additive were used. The measured physical properties are shown in the following Tables 1 and 2.

Example 6

The process was performed in the same manner as in Example 5, except that 10 g of a 10 wt % aqueous solution of polyvinylpyrrolidone (weight average molecular weight: 360,000 g/mol) was used instead of polyvinylpyrrolidone (weight average molecular weight: 55,000 g/mol) which was the additive. The measured physical properties are shown in the following Tables 1 and 2.

Example 7

The process was performed in the same manner as in Example 2, except that 17.5 g of potassium hydroxide was used instead of sodium hydroxide during the saponification reaction. The mole composition of ratio the synthesized copolymer of vinyl acetate/vinyl alcohol/methyl acrylate/potassium acrylic acid was 17/50/7/26. The measured physical properties are shown in the following Tables 1 and 2.

Example 8

The process was performed in the same manner as in Example 7, except that 8 g of the saponified copolymer, 72 g of water, and 20 g of a 10 wt % aqueous solution of polyvinylpyrrolidone (weight average molecular weight: 55,000 g/mol) instead of the branched polyethyleneimine (weight average molecular weight: 25,000 g/mol) which was the additive were used. The measured physical properties are shown in the following Tables 1 and 2.

Example 9

The process was performed in the same manner as in Example 7, except that 9.5 g of the saponified copolymer, 85.5 g of water, and 5 g of a 10 wt % aqueous solution of polyvinylpyrrolidone (weight average molecular weight: 1,300,000 g/mol) instead of the branched polyethyleneimine (weight average molecular weight: 25,000 g/mol) which was the additive were used. The measured physical properties are shown in the following Tables 1 and 2.

Example 10

The process was performed in the same manner as in Example 2, except that 40 g of vinyl acetate and 10 g of methyl acrylate were used in the synthesis of the copolymer, and 8.4 g of sodium hydroxide was used during the saponification reaction. The weight average molecular weight of the synthesized vinyl acetate/methyl acrylate copolymer was 680 kDa, and the mole composition ratio of the vinyl acetate/vinyl alcohol/methyl acrylate/sodium acrylic acid copolymer was 21/59/3/17. The measured physical properties are shown in the following Tables 1 and 2.

Example 11

The process was performed in the same manner as in Example 10, except that 9 g of the saponified copolymer, 81 g of water, and 10 g of a 10 wt % aqueous solution of polyvinylpyrrolidone (weight average molecular weight: 360,000 g/mol) instead of the branched polyethyleneimine (weight average molecular weight: 25,000 g/mol) which was the additive were used. The measured physical properties are shown in the following Tables 1 and 2.

Example 12

The process was performed in the same manner as in Example 2, except that 16.5 g of vinyl acetate and 33.5 g of methyl acrylate were used in the synthesis of the copolymer, and 10.5 g of sodium hydroxide was used during the saponification reaction. The weight average molecular weight of the synthesized vinyl acetate/methyl acrylate copolymer was 560 kDa, and the mole composition ratio of the vinyl acetate/vinyl alcohol/methyl acrylate/sodium acrylic acid copolymer was Dec. 17, 1933/38. The measured physical properties are shown in the following Tables 1 and 2.

Example 13

The process was performed in the same manner as in Example 12, except that 9 g of the saponified copolymer, 81 g of water, and 10 g of a 10 wt % aqueous solution of polyvinylpyrrolidone (weight average molecular weight: 360,000 g/mol) instead of the branched polyethyleneimine (weight average molecular weight: 25,000 g/mol) which was the additive were used. The measured physical properties are shown in the following Tables 1 and 2.

Comparative Example 1

The process was performed in the same manner as in Example 6, except that PVA (Polyvinyl alcohol, saponification degree: 80%) was used instead of the saponified copolymer. The measured physical properties are shown in the following Tables 1 and 2.

Comparative Example 2

The process was performed in the same manner as in Example 2, except that polyacrylic acid sodium salt (PAANa) (Sigma Aldrich) was used instead of the saponified copolymer. The measured physical properties are shown in the following Tables 1 and 2.

Comparative Example 3

The process was performed in the same manner as in Example 1, except that a mixture of styrene-butadiene rubber (SBR) (Sigma Aldrich) and carboxymethyl cellulose sodium salt (CMC) (Sigma Aldrich) combined at a weight ratio of 1:1 was used instead of the binder composition in the manufacture of a secondary battery negative electrode. The measured physical properties are shown in the following Tables 1 and 2.

Comparative Example 4

The process was performed in the same manner as in Example 1, except that no additive was added. The measured physical properties are shown in the following Tables 1 and 2.

TABLE 1

| | Additive | Degree of saponification (b + d)/(a + b + c + d) | Weight average molecular weight (Mw, kDa) | Tensile strength (kgf/cm$^2$) | Yield strain (%) | Adhesion (N/20 mm) |
|---|---|---|---|---|---|---|
| Example 1 | B-PEI (800) | 0.75 | 760 | 1420 | 4.3 | 5.0 |
| Example 2 | B-PEI (25000) | 0.75 | 760 | 1608 | 4.2 | 5.5 |
| Example 3 | B-PEI (270000) | 0.75 | 760 | 1743 | 3.8 | 5.7 |
| Example 4 | L-PEI (13000) | 0.75 | 760 | 1390 | 4.1 | 4.4 |
| Example 5 | PVP (55000) | 0.75 | 760 | 1722 | 4.2 | 5.6 |
| Example 6 | PVP (360000) | 0.75 | 760 | 1669 | 4.4 | 5.8 |
| Example 7 | B-PEI (25000) | 0.76 | 760 | 891 | 3.8 | 6.0 |
| Example 8 | PVP (55000) | 0.76 | 760 | 1689 | 4.1 | 4.6 |
| Example 9 | PVP (1300000) | 0.76 | 760 | 1512 | 4.0 | 4.2 |
| Example 10 | B-PEI (25000) | 0.76 | 680 | 1432 | 4.6 | 5.0 |
| Example 11 | PVP (360000) | 0.76 | 680 | 1701 | 4.2 | 4.9 |
| Example 12 | B-PEI (25000) | 0.55 | 560 | 1500 | 4.3 | 5.2 |
| Example 13 | PVP (360000) | 0.55 | 560 | 1560 | 4.4 | 5.3 |
| Comparative Example 1 | PVP (360000) | 1 | 205 | 783 | 6.0 | 3.0 |
| Comparative Example 2 | B-PEI (25000) | 1 | 83 | 1837 | 2.4 | 3.3 |
| Comparative Example 3 | — | — | — | 145 | 180 | 2.5 |
| Comparative Example 4 | — | 0.75 | 760 | 1340 | 4.0 | 4.0 |

B-PEI (Mw): branched polyethyleneimine having a weight average molecular weight (Mw)

L-PEI (Mw): linear polyethyleneimine having a weight average molecular weight (Mw)

PVP (Mw): polyvinylpyrrolidone having a weight average molecular weight (Mw)

TABLE 2

| | Slurry composition coatability | 1 cycle charge capacity (mAh/g) | 1 cycle discharge capacity (mAh/g) | Initial efficiency (%) | Expansion rate (%) | Capacity retention rate (%) after 50 cycles of charging and discharging |
|---|---|---|---|---|---|---|
| Example 1 | ○ | 626 | 580 | 92.7 | 41 | 84 |
| Example 2 | ◎ | 629 | 581 | 92.4 | 38 | 94 |
| Example 3 | ○ | 624 | 577 | 92.5 | 40 | 83 |
| Example 4 | ○ | 627 | 577 | 92.0 | 41 | 87 |
| Example 5 | ○ | 625 | 579 | 92.6 | 41 | 91 |
| Example 6 | ◎ | 628 | 580 | 92.4 | 38 | 92 |
| Example 7 | ◎ | 631 | 582 | 92.2 | 38 | 94 |
| Example 8 | ○ | 627 | 578 | 92.2 | 42 | 88 |
| Example 9 | ○ | 629 | 581 | 92.4 | 44 | 88 |
| Example 10 | ◎ | 626 | 579 | 92.5 | 44 | 92 |
| Example 11 | ◎ | 626 | 580 | 92.7 | 41 | 92 |
| Example 12 | ○ | 628 | 578 | 92.0 | 44 | 92 |
| Example 13 | ○ | 625 | 576 | 92.2 | 40 | 89 |
| Comparative Example 1 | X | 632 | 575 | 91.0 | 83 | 66 |
| Comparative Example 2 | X | 628 | 574 | 91.4 | 85 | 62 |
| Comparative Example 3 | Δ | 613 | 566 | 92.4 | 78 | 64 |
| Comparative Example 4 | ○ | 627 | 581 | 92.6 | 61 | 78 |

In Tables 1 and 2, it was confirmed that the binder composition for a secondary battery according to the examples had excellent tensile strength and adhesion, and when a negative electrode slurry composition including the binder composition was prepared, the slurry composition had no agglomeration and excellent coatability. In addition, it was confirmed that the binder composition for a secondary battery according to an exemplary embodiment improved a binding force between a negative electrode current collector and a negative electrode active material by the excellent coatability and adhesion, and had a significantly low expansion rate and an effectively improved capacity retention rate after 50 cycles of charging and discharging, as compared with the comparative examples.

In particular, in Example 2 using the polymer-type additive containing nitrogen (N) bonded to two or three carbons (C) in the repeating unit, the expansion rate and the capacity retention rate after 50 cycles were significantly improved, as compared with Comparative Example 4 which did not use the polymer-type additive, from which it was confirmed that since the additive was added, the binder composition for a secondary battery described above formed a robust three-dimensional structure, and thus, the secondary battery manufactured therefrom may implement further improved physical properties.

Thus, the binder composition for a secondary battery described above improves a binding force between the negative electrode current collector and the negative electrode active material, thereby obtaining an effect of suppressing the exfoliation and desorption of the negative electrode active material, and thus, the expansion of the negative electrode is effectively suppressed to improve the charge/discharge cycle characteristics and the performance of a secondary battery.

The present disclosure may provide a binder composition for a secondary battery having improved mechanical properties and adhesion properties, a negative electrode slurry composition for a secondary battery including the same, a negative electrode manufactured using the same, and a secondary battery including the negative electrode.

Accordingly, the binder composition for a secondary battery according to an exemplary embodiment may produce a novel binder having a three-dimensional structure by using a polymer-type additive containing nitrogen (N) bonded to two or three carbons (C) in the repeating unit, and when the binder is applied to a negative electrode and a secondary battery, the expansion of the negative electrode is effectively suppressed, and the charge/discharge cycle characteristics and the performance of the secondary battery are significantly improved. In addition, the binder composition for a secondary battery has improved coatability and adhesion to effectively suppress the exfoliation and desorption of the negative electrode active material, thereby improving the performance of the secondary battery.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A binder composition for a secondary battery, the binder composition comprising a copolymer and a polymer-type additive comprising nitrogen (N) bonded to two or three carbons (C) in the repeating unit, wherein the copolymer comprises a repeating unit (a) of the following Chemical Formula 1, a repeating unit (b) of the following Chemical Formula 2, a repeating unit (c) of the following Chemical Formula 3, and a repeating unit (d) of the following Chemical Formula 4:

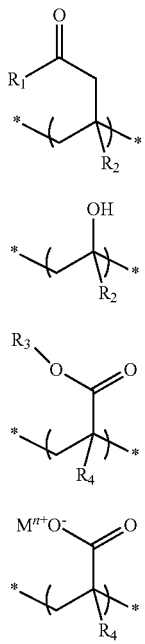

[Chemical Formula 1]

[Chemical Formula 2]

[Chemical Formula 3]

[Chemical Formula 4]

wherein
$R_1$ and $R_3$ are independently substituted or unsubstituted hydrocarbyl having 1 to 10 carbon atoms;
$R_2$ and $R_4$ are independently hydrogen or substituted or unsubstituted hydrocarbyl having 1 to 10 carbon atoms;
$M^{n+}$ is a cation having an oxidation number of n except for a hydrogen ion; and
n is an integer of 1 to 3.

2. The binder composition for a secondary battery of claim 1, wherein the polymer-type additive is a polyalkyleneimine-based polymer or a polyvinylpyrrolidone-based polymer.

3. The binder composition for a secondary battery of claim 1, wherein the polymer-type additive is a branched polyalkyleneimine-based polymer.

4. The binder composition for a secondary battery of claim 1, wherein the polymer-type additive is a branched polyethyleneimine having a weight average molecular weight of 10,000 to 50,000 g/mol.

5. The binder composition for a secondary battery of claim 1, wherein the polymer-type additive is comprised at 0.1 to 20 wt % with respect to the binder composition for a secondary battery.

6. The binder composition for a secondary battery of claim 1, wherein the copolymer has (a+b):(c+d) of 0.05 to 0.95:0.95 to 0.05, in which a, b, c, and d are mole fractions of the repeating units (a), (b), (c), and (d), respectively, in the copolymer.

7. The binder composition for a secondary battery of claim 1, wherein the copolymer satisfies the following Equation 1:

$$0.5 < (b+d)/(a+b+c+d) < 1.0$$ [Equation 1]

wherein
a, b, c, and d are mole fractions of the repeating units (a), (b), (c), and (d), respectively, in the copolymer.

8. The binder composition for a secondary battery of claim 1, wherein the copolymer is a linear polymer.

9. The binder composition for a secondary battery of claim 1, wherein the copolymer has a weight average molecular weight of 200,000 to 2,000,000 Da.

10. The binder composition for a secondary battery of claim 1, wherein the binder composition for a secondary battery is a binder composition for a lithium secondary battery negative electrode.

11. A secondary battery comprising: a positive electrode and a negative electrode for a secondary battery,
wherein the negative electrode for a secondary battery comprises a current collector; and a negative electrode active material layer disposed on the current collector, and the negative electrode active material layer comprises the binder composition for a secondary battery of claim 1 and a negative electrode active material.

12. The secondary battery of claim 11, wherein the negative electrode active material comprises a silicon-based active material.

13. The secondary battery of claim 12, wherein the negative electrode active material further comprises a graphite-based active material.

14. The secondary battery of claim 13, wherein a mass ratio between the silicon-based active material and the graphite-based active material is 3 to 97:97 to 3.

15. The secondary battery of claim 11, wherein the binder composition for a secondary battery is comprised at 0.5 to 30 wt % with respect to the negative electrode active material layer.

16. A method of preparing a binder composition for a secondary battery, the method comprising the steps of:
step (A) saponifying a copolymer comprising a repeating unit (a) of the following Chemical Formula 1 and a repeating unit (c) of the following Chemical Formula 3 to prepare a saponified copolymer; and
step (B) mixing the saponified copolymer and a polymer-type additive comprising nitrogen (N) bonded to two or three carbons (C) in the repeating unit,
wherein the saponified copolymer comprises the repeating unit (a) of the following Chemical Formula 1, a repeating unit (b) of the following Chemical Formula 2, the repeating unit (c) of the following Chemical Formula 3, and a repeating unit (d) of the following Chemical Formula 4:

[Chemical Formula 1]

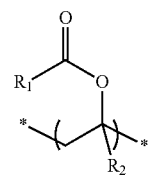

[Chemical Formula 2]

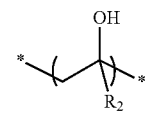

[Chemical Formula 3]

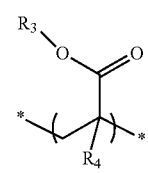

-continued

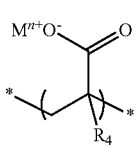

[Chemical Formula 4]

wherein
$R_1$ and $R_3$ are independently substituted or unsubstituted hydrocarbyl having 1 to 10 carbon atoms;
$R_2$ and $R_4$ are independently hydrogen or substituted or unsubstituted hydrocarbyl having 1 to 10 carbon atoms;
$M^{n+}$ is a cation having an oxidation number of n except for a hydrogen ion; and
n is an integer of 1 to 3.

17. The method of preparing a binder composition for a secondary battery of claim 16, wherein a degree of saponification in step (A) is more than 0.5 and less than 1.0, and the degree of saponification is calculated by (b+d)/(a+b+c+d), in which a, b, c, and d are mole fractions of the repeating units (a), (b), (c), and (d) in the saponified copolymer.

* * * * *